(12) United States Patent
Reed

(10) Patent No.: US 10,582,400 B2
(45) Date of Patent: *Mar. 3, 2020

(54) OVER THE AIR TESTING FOR MASSIVE MIMO ARRAYS

(71) Applicant: Spirent Communications, Inc., San Jose, CA (US)

(72) Inventor: John Douglas Reed, Arlington, TX (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/262,729

(22) Filed: Jan. 30, 2019

(65) Prior Publication Data

US 2019/0166512 A1 May 30, 2019

Related U.S. Application Data

(63) Continuation of application No. 15/620,610, filed on Jun. 12, 2017, now Pat. No. 10,244,411.

(Continued)

(51) Int. Cl.
*H04W 24/06* (2009.01)
*H04B 7/0413* (2017.01)
(Continued)

(52) U.S. Cl.
CPC .......... *H04W 24/06* (2013.01); *H04B 7/0413* (2013.01); *H04B 17/15* (2015.01);
(Continued)

(58) Field of Classification Search
None
See application file for complete search history.

(56) References Cited

U.S. PATENT DOCUMENTS

| 5,548,820 A | 8/1996 | Victorin |
| 6,236,363 B1 | 5/2001 | Robbins et al. |

(Continued)

OTHER PUBLICATIONS

PCT/US2010/024204—International Search Report and Written Opinion dated Aug. 2, 2010, 9 pages.

(Continued)

*Primary Examiner* — Lana N Le
(74) *Attorney, Agent, or Firm* — Haynes Beffel & Wolfeld, LLP; Ernest J. Beffel, Jr.; Paul A. Durdik

(57) ABSTRACT

The disclosed system for testing a massive MIMO beam-forming antenna array of arbitrary size includes an anechoic chamber, and a mount for a MIMO array antenna positioned in the chamber, wherein the array has at least 8×4 antenna elements that are individually activated to steer transmissions from the array. The system includes dual element antenna probes positionable in the anechoic chamber, with feeds coupling one or more UE sources to the antenna probes; and the UE sources generate RF in OTA communication with the array, emulating multiple UE devices. Additionally the system includes base station electronics coupled to the array, and a test controller coupled to the base station electronics. The test controller signals the UE sources OTA via the array to invoke a connection to the UE sources and measure OTA channel performance between the array and the multiple UE devices emulated, the performance including at least throughput.

18 Claims, 11 Drawing Sheets
(10 of 11 Drawing Sheet(s) Filed in Color)

Related U.S. Application Data

(60) Provisional application No. 62/350,131, filed on Jun. 14, 2016.

(51) Int. Cl.
*H04W 16/28* (2009.01)
*H04B 17/15* (2015.01)
*H04B 17/391* (2015.01)
*H04B 17/309* (2015.01)

(52) U.S. Cl.
CPC ........... *H04W 16/28* (2013.01); *H04B 17/309* (2015.01); *H04B 17/3911* (2015.01); *H04B 17/3912* (2015.01)

(56) References Cited

U.S. PATENT DOCUMENTS

| | | | |
|---|---|---|---|
| 6,349,218 | B1 | 2/2002 | Nakagawa et al. |
| 6,571,082 | B1 | 5/2003 | Rahman et al. |
| 6,952,455 | B1 | 10/2005 | Banister |
| 7,224,941 | B2 | 5/2007 | Liu |
| 7,324,588 | B2 | 1/2008 | Green et al. |
| 7,395,060 | B2 | 7/2008 | Liu |
| 7,398,056 | B1 | 7/2008 | Ebert et al. |
| 7,508,868 | B2 | 3/2009 | Chang |
| 7,715,844 | B2 | 5/2010 | Bi et al. |
| 8,331,869 | B2 | 12/2012 | Foegelle |
| 8,412,112 | B2 | 4/2013 | Foegelle |
| 8,457,026 | B1* | 6/2013 | Ho ................... H04B 7/0617 342/359 |
| 8,761,684 | B2 | 6/2014 | Reed |
| 8,787,900 | B2 | 7/2014 | Amine et al. |
| 8,793,093 | B2 | 7/2014 | Mow et al. |
| 8,824,588 | B2 | 9/2014 | Emmanuel et al. |
| 8,880,002 | B2 | 11/2014 | Falck et al. |
| 8,912,963 | B2 | 12/2014 | Mow et al. |
| 8,995,511 | B2 | 3/2015 | Reed |
| 9,024,828 | B2 | 5/2015 | Reed |
| 9,107,098 | B2 | 8/2015 | Emmanuel et al. |
| 9,209,914 | B2 | 12/2015 | Reed |
| 9,246,607 | B2 | 1/2016 | Reed et al. |
| 10,033,473 | B1* | 7/2018 | Kyrolainen ......... H04B 17/3912 |
| 10,244,411 | B2* | 3/2019 | Reed ................... H04W 24/06 |
| 2003/0050020 | A1 | 3/2003 | Erceg et al. |
| 2003/0124982 | A1 | 7/2003 | Saari et al. |
| 2004/0259554 | A1 | 12/2004 | Rappaport et al. |
| 2005/0085223 | A1* | 4/2005 | Liu ..................... H04B 17/20 455/423 |
| 2006/0148429 | A1 | 7/2006 | Inogai et al. |
| 2006/0229018 | A1 | 10/2006 | Mlinarsky et al. |
| 2006/0229020 | A1 | 10/2006 | Mlinarsky et al. |
| 2006/0233111 | A1 | 10/2006 | Wright |
| 2006/0252419 | A1 | 11/2006 | Liu |
| 2007/0019769 | A1 | 1/2007 | Green et al. |
| 2007/0236230 | A1 | 10/2007 | Tanbakuchi et al. |
| 2007/0243826 | A1 | 10/2007 | Liu |
| 2008/0056340 | A1 | 3/2008 | Foegelle |
| 2008/0114580 | A1 | 5/2008 | Chin et al. |
| 2008/0139195 | A1 | 6/2008 | Marsyla et al. |
| 2009/0094492 | A1 | 4/2009 | Music et al. |
| 2010/0177813 | A1 | 7/2010 | Gessner |
| 2010/0285753 | A1 | 11/2010 | Foegelle |
| 2011/0084887 | A1 | 4/2011 | Mow et al. |
| 2011/0189962 | A1 | 8/2011 | Kyosti et al. |
| 2011/0191090 | A1 | 8/2011 | Kyosti et al. |
| 2011/0299570 | A1 | 12/2011 | Reed |
| 2012/0098713 | A1 | 4/2012 | Mow et al. |
| 2012/0225624 | A1 | 9/2012 | Kyosti et al. |
| 2012/0275506 | A1 | 11/2012 | Ding et al. |
| 2012/0282863 | A1 | 11/2012 | Guo et al. |
| 2012/0309323 | A1 | 12/2012 | Guo et al. |
| 2013/0027256 | A1 | 1/2013 | Guo et al. |
| 2013/0210474 | A1 | 8/2013 | Kyosti |
| 2013/0235962 | A1* | 9/2013 | O'Keefe ............... H01Q 3/267 375/371 |
| 2014/0241408 | A1 | 8/2014 | Sozanski et al. |
| 2015/0017928 | A1 | 1/2015 | Griesing et al. |
| 2016/0226709 | A1 | 8/2016 | Chen et al. |
| 2016/0233970 | A1* | 8/2016 | Reed ..................... H04B 17/29 |
| 2017/0063503 | A1* | 3/2017 | Liu ....................... H04L 5/0044 |
| 2017/0222735 | A1* | 8/2017 | Kawamura ........... H04B 17/102 |
| 2017/0279546 | A1* | 9/2017 | McGarry ........... H04B 17/0085 |
| 2017/0331670 | A1* | 11/2017 | Parkvall ............ H04W 52/0274 |
| 2018/0027434 | A1* | 1/2018 | Foegelle .............. H04B 7/0617 455/67.13 |
| 2018/0034560 | A1 | 2/2018 | Foegelle |
| 2018/0277928 | A1* | 9/2018 | Hartenstein .............. H01Q 1/24 |
| 2018/0337738 | A1* | 11/2018 | Wen ................... H04B 17/0087 |
| 2019/0103665 | A1* | 4/2019 | Yoo ........................ H01Q 1/364 |

OTHER PUBLICATIONS

U.S. Appl. No. 14/801,746—Office Action dated Jun. 28, 2016, 14 pages.

Rumney, "LTE and the Evolution to 4G Wireless: Design and Measurement Challenges," Agilent Technologies Publication, Chapter 6: "Design and Verification Challenges", 2009, pp. 199-411.

"Move Forward to What's Possible in LTE," Agilent Technologies, Inc., Mar. 16, 2009, pp. 1-12, accessed at http://www.agilent.com/find/lte.

"Agilent 3GPP Long Term Evolution: System Overview, Product Development, and Test Challenges," Application Note, Agilent Technologies, Inc., Sep. 8, 2009, pp. 1-92, accessed at http://www.agilent.com/find/LTE.

"E6620 Wireless Communications Test Set," Agilent Technologies, Inc., Jun. 8, 2009, pp. 1-12, accessed at http://www.agilent.com/find/8960devicedesign.

Technical White Paper, "Long Term Evolution (LTE): A Technical Overview," Motorola, Inc., 2007, pp. 1-15, accessed at www.motorola.com.

Narandzic, et al., "Comparison of SCM, SCME, and WINNER Channel Models," IEEE, 2007, pp. 413-417.

Berger, Lars T., et al., "Geometry Based Other-Sector Interference Modelling for Downlink Systme Simulations", 2004, 5 pages.

Baum, Daniel S., et al., "An Interim Channel Model for Beyond-3G Systems", 2005, 5 pages.

Cita, "Test Plan for 2×2 Downlink MIMO and Transmit Diversity Over-the-Air Performance", Aug. 2015, 75 pages.

Huang, Kaibin, et al., "Spacial Interference Cancellation for Mulitantenna Mobile Ad Hoc Networks", Mar. 2012, 17pages.

Written Opinion of corresponding PCT Application No. PCT/US2010/024202, dated Sep. 17, 2010, pp. 1-4.

U.S. Appl. No. 14/801,746—Office Action dated Apr. 11, 2017, 11 pages.

U.S. Appl. No. 14/801,746—Response to Office Action dated Jun. 28, 2016 filed Sep. 9, 2016, 10 pages.

U.S. Appl. No. 14/801,746—Final Office Action dated Nov. 25, 2016, 13 pages.

U.S. Appl. No. 14/801,746—Response to Final Office Action dated Nov. 25, 2016 filed Feb. 21, 2017, 11 pages.

Reed, "MIMO OTA Antenna Measurements", CTIA Panel Session, Mar. 2011, Orlando.

Fundamentals of channel emulation, Mar. 15, 2012, octoScope, 225 Cedar Hill Street, Ste. 200, Marlborough, MA 01752 USA, www.octoScope.com.

Reed, "MIMO OTA Test Methods", CTIA Panel Session, May 2012, 32 pages, New Orleans, LA.

PCT/US2010/024204—International Preliminary Report on Patentability dated Aug. 16, 2011, 5 pages.

U.S. Appl. No. 13/147,579—Preliminary Amendment dated Aug. 2, 2011, 9 pages.

U.S. Appl. No. 13/147,579—Office Action dated Mar. 13, 2014, 17 pages.

U.S. Appl. No. 13/147,579—Response to Office Action dated Mar. 13, 2014 filed Aug. 13, 2014, 13 pages.

(56) References Cited

OTHER PUBLICATIONS

U.S. Appl. No. 13/147,579—Notice of Allowance dated Nov. 24, 2014, 8 pages.
U.S. Appl. No. 15/620,610—Office Action dated Dec. 21, 2017, 9 pages.
Meinila et al., "D5.3: WINNER+ Final Channel Models", Celtic Telecommunication Solutions, CELTIC/CP5-026, WP5, Editor: Petted Heino, Jun. 30, 2010, pp. 1-107.
U.S. Appl. No. 14/801,746—Response to Office Action dated Apr. 11, 2017 filed Aug. 10, 2017, 12 pages.
U.S. Appl. No. 14/801,746—Final Office Action dated Oct. 17, 2017, 19 pages.
Meinila et al, D5.3: WINNER+Final Channel Models, Wireless World Initiative New Radio—Celtic Telecommunication Solutions, WINNER+, Version 1.0, Jun. 30, 2010, pp. 1-107.
Macom Technology Data Sheet, MAPS-010165, Digital Phase Shifter 6-Bit, 35-6.0 GHz, V3, MACOM Technology Solutions Inc., 8 pages, Jan. 19, 2017.
Darbari et al, "MIMO Channel Modelling (Miron Signal Processing)", pp. 77-117, University of Strathclyde, Glasgow, ISBN 978-953-7619-91-6, published by InTech, Mar. 1, 2010, www.intechopen.com.
Spirent Vertex Channel Emulator Technical Specifications, Aug. 29, 2017, 2 pages.
Spirent Vertex Channel Emulator Data Sheet, rev. D, Aug. 2017, 4 pages.
"Programmable Phase Shifters", HJ Technologies, 64×16-1024, http://www.haojintech.com/index.php/product/index/id/167.html, Oct. 2, 2017, 3 pages.
"Programmable Phase Shifters", HJ Technologies, 16×16-256, http://www.haojintech.com/index.php/product/index/id/167.html, Oct. 2, 2017, 3 pages.
Harris et al, "From MIMO to Massive Mimo", University of Bristol (U.K.): Ian Mings British Telecom (BT), Sep. 15, 2017, Microwave Journal, http://www.microwavejournal.com/articles/print/28974-from-mimo-to-massive-mimo, 10 pages.
"Introduction to Network Analyzer Measurements", www.ni.com/rf-academy, National Instruments, Mar. 5, 2014, pp. 1-44.
"5G Spectrum Public Policy Position", Nov. 2016, GSMA, London EC4n 8AF UK, www.gsma.com, pp. 1-7.
"MIMO Beamforming Test System", https://www.spirent.com/Products/MIMO_Beamforming_Test_System, Oct. 10, 2017, pp. 1-4.
Larsson et al, "Massive MIMO for Next Generation Wireless Systems", IEEE Communications Magazine, vol. 52, issue 2, Jan. 21, 2014, pp. 1-20.
Hoydis et al, "Massive MIMO in the UL/DL of Cellular Networks: How Many Antennas Do We Need?", IEEE Journal on Selected Areas in Communications, Institute of Electrical and Electronics Engineers, 2013, 31 (2), Jan. 8, 2014, pp. 160-171.
Bjornson et al, "Massive MIMO Systems with Hardware-Constrained Base Stations", Access Centre, Dept. of Signal Processing, KTH Royal Institute of Technology, Stockholm, Sweden, Mar. 19, 2014, pp. 1-5.
PCT/US2010/024202—International Search Report and Written Opinion dated Sep. 17, 2010, 11 pages.
Rusek et al, "Scaling Up MIMO: Opportunities and Challenges with Very Large Arrays", INFONET, GIST Journal Club, Mar. 21, 2013, IEEE Signal Processing Magazine, pp. 1-12.
Li et al, "Dynamic Beamforming for Three-Dimensional MIMO Technique in LTE-Advanced Networks", Wireless SIgnal Processing and Network Lab, Key Lab of Universal Wireless Communications (Ministry of Education), Beijing University of Posts and Telecommunications, Hindawi Publishing Corp., Intl. Journal of Antennas and Propagation, vol. 2013, Article ID 764507, http://dx.doi.org/10.1155/2013/764507, Jul. 4, 2013, pp. 1-9.
Raschkowski et al, "METIS Channel Models", d1.4, https://www.metis2020.com/wp-content/uploads/METIS_D1.4_v3_pdf.2015, Mobile and wireless communications Enablers for the Twenty-twenty information Society (METIS), Jul. 14, 2015, 223 pages.
Molisch et al, "Hybrid Beamforming for Massive MIMO—A Survey", IEEE Comm. Mag., vol. 55, iss. 9, 2017, Apr. 30, 2017, pp. 1-13.
U.S. Appl. No. 14/801,746—Response to Final Office Action dated Oct. 17, 2017 filed Apr. 9, 2018, 20 pages.
U.S. Appl. No. 14/801,746—Office Action dated Jul. 9, 2018, 18 pages.
U.S. Appl. No. 14/801,746—Response to Office Action dated Jul. 9, 2018 filed Aug. 23, 2018, 15 pages.
U.S. Appl. No. 14/801,746—Notice of Alliowance dated Nov. 6, 2018, 7 pages.
U.S. Appl. No. 15/620,610—Response to Office Action dated Dec. 21, 2017, filed Mar. 20, 2018, 9 pages.
U.S. Appl. No. 15/620,610—Notice of Allowance dated Jul. 16, 2018, 5 pages.
U.S. Appl. No. 15/620,610—Notice of Allowance dated Aug. 9, 2018, 2 pages.
U.S. Appl. No. 15/620,610—Notice of Allowance dated Oct. 31, 2018, 21 pages.
U.S. Appl. No. 15/782,769—Office Action dated Nov. 2, 2018, 22 pages.

\* cited by examiner

Fig. 10 Computer System

OVER THE AIR TESTING FOR MASSIVE MIMO ARRAYS

RELATED APPLICATIONS

This application is a continuation of claims the benefit of U.S. patent application Ser. No. 15/620,610, entitled "OVER THE AIR TESTING FOR MASSIVE MIMO ARRAYS", filed on Jun. 12, 2017, which claims the benefit of U.S. Provisional Application No. 62/350,131, entitled "OVER THE AIR TESTING FOR MASSIVE MIMO ARRAYS," filed on Jun. 14, 2016, which is incorporated by reference herein.

This application is related to U.S. patent application Ser. No. 14/801,746, entitled "Massive MIMO Array Emulation," filed Jul. 16, 2015, which is incorporated by reference herein.

This application is related to U.S. patent application Ser. No. 13/147,579, entitled "Emulation and Controlled Testing of MIMO OTA Channels," filed Aug. 29, 2011, now U.S. Pat. No. 8,995,511, issued Mar. 31, 2015, which is incorporated by reference herein.

BACKGROUND

Massive multiple-input multiple-output (MIMO) provides an effective means for significantly increasing the capacity of cellular communication systems while possibly reducing their energy consumption. Multiple-Input-Multiple-Output (MIMO) antenna techniques are key factors in achieving the high data rates promised by next-generation wireless technologies such as LTE (Long-Term Evolution), LTE-Advanced and planned $5^{th}$ generation technologies.

MIMO systems are designed to take advantage of spatial diversity available in the propagation environment. The spatial diversity is quantified by the correlation between antennas, a function of both the propagation environment and the antenna patterns. Under ideal conditions an M×N MIMO system (one using M transmitting antenna elements and N receiving antenna elements) can increase maximum data rates by a factor of $\min\{M,N\}$ times those available from a Single-Input Single-Output (SISO) system operating in the same bandwidth. In other words, a 4×2 MIMO system can (under ideal conditions) double the data rates available in a SISO implementation, while a 4×4 MIMO system can potentially quadruple those rates. However, classical array modeling via MIMO emulation is expensive and prohibitively complex to build, and channel emulators have a limited number of possible inputs.

As the demand for higher bandwidths continues to grow, designers use higher frequencies—for example, as high as 60 gigahertz. When higher frequencies are used, the size of transmit antenna elements decreases, with a result that each element produces lower path gains—with a resulting power change of as much as 30 dB less. The use of massive MIMO boosts resulting beam signal strength. There is also a demand for multiple users in the same cell with separate signals, called multiple-user MIMO.

Emulation of massive MIMOs makes it possible to group hundreds of fading links computed in hardware into a tractable number of virtual elements, for increasing data rates and for testing for massive MIMOs.

An opportunity arises to provide systems and methods for testing massive MIMO arrays.

SUMMARY

One implementation of the disclosed technology teaches a system that tests a massive MIMO array antenna. The system includes an anechoic chamber, and a mount for a MIMO array antenna positioned in the chamber, wherein the array has at least 8×4 antenna elements that are individually activated to steer transmissions from the array. The system also includes at least four dual element antenna probes positionable in the anechoic chamber, with feeds coupling one or more UE sources to the antenna probes; and the UE sources generate RF in over-the-air communication with the array, emulating multiple UE devices. Additionally the system includes base station electronics coupled to the array, and a test controller coupled to the base station electronics, wherein the test controller signals the UE sources over-the-air via the array to invoke a connection to the UE sources and measure over-the-air channel performance between the array and each of the multiple UE devices emulated, the performance including at least throughput.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
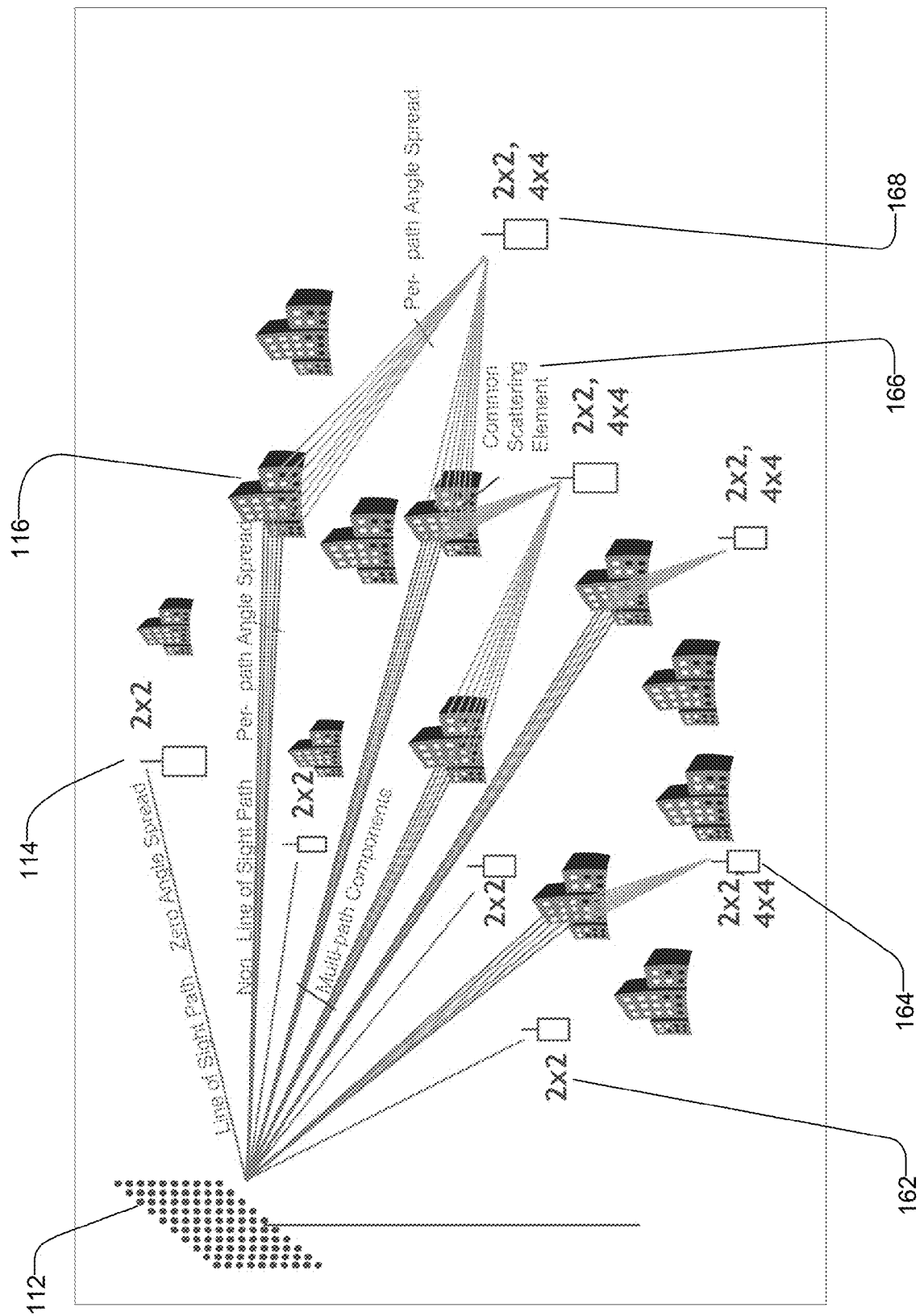
FIG. 1 shows an example massive MIMO array environment.

The following description of the disclosure will typically be with reference to specific embodiments and methods. It is to be understood that there is no intention to limit the disclosure to the specifically disclosed embodiments and methods, but that the disclosure may be practiced using other features, elements, methods and embodiments. Preferred embodiments are described to illustrate the present disclosure, not to limit its scope. Those of ordinary skill in the art will recognize a variety of equivalent variations on the description that follows. Like elements in various embodiments are commonly referred to with like reference numerals.

Massive MIMO systems are generally designed to communicate with one to many simultaneous users. FIG. 1 illustrates a possible OTA MIMO array testing environment, which contains a massive MIMO array of antennas (MM) 112, and a mix of line-of-sight (LOS) 114, 162 and non-line-of-sight (NLOS) 162, 168 users scattered about a coverage area. For NLOS users, the propagation paths are obstructed in some way—creating a set of sub-components of the path, which are modeled by an angle spread (AS). The AS observed at the base station is usually quite narrow, being a few degrees in azimuth and elevation. The spread in azimuth is usually a bit more than the spread in elevation. The AS observed by the user equipment (UE) 168 is generally much higher due to the proximity to the scattering elements 116, 166. Sometimes a common scattering element may provide signal to more than one UE.

Massive MIMO array antennas may have a large number of radiating elements, usually in a rectangular grid 112 with element spacing equal to one half the wavelength of the carrier frequency. This spacing may vary, but is usually less than the wavelength of the carrier frequency. When dual polarized elements are used, often +/−45 degree antenna elements or 0/+90 degree elements are co-located, and spaced apart from the next pair of elements in the grid. These dual polarized elements enable the antenna to couple signals to and from the channel in vertical and horizontal polarization. Massive MIMO array antennas are valid for both uplink and downlink signals, supporting division duplexing (TDD) or frequency division duplexing (FDD). Packets can be interspersed between downlink packets and uplink packets.

Multipath propagation is often observed for NLOS users. This type of propagation is indicated by having more than one path that reaches the UE, usually with each path having different path delays and different angles of departure and arrival observed at the base station (BS) and the UE respectively.

The disclosed technology emulates a mixed environment, having one or more users, which will experience one of several different propagation mechanisms, e.g. some as described above, in order to test a massive MIMO system.

Figure 2:
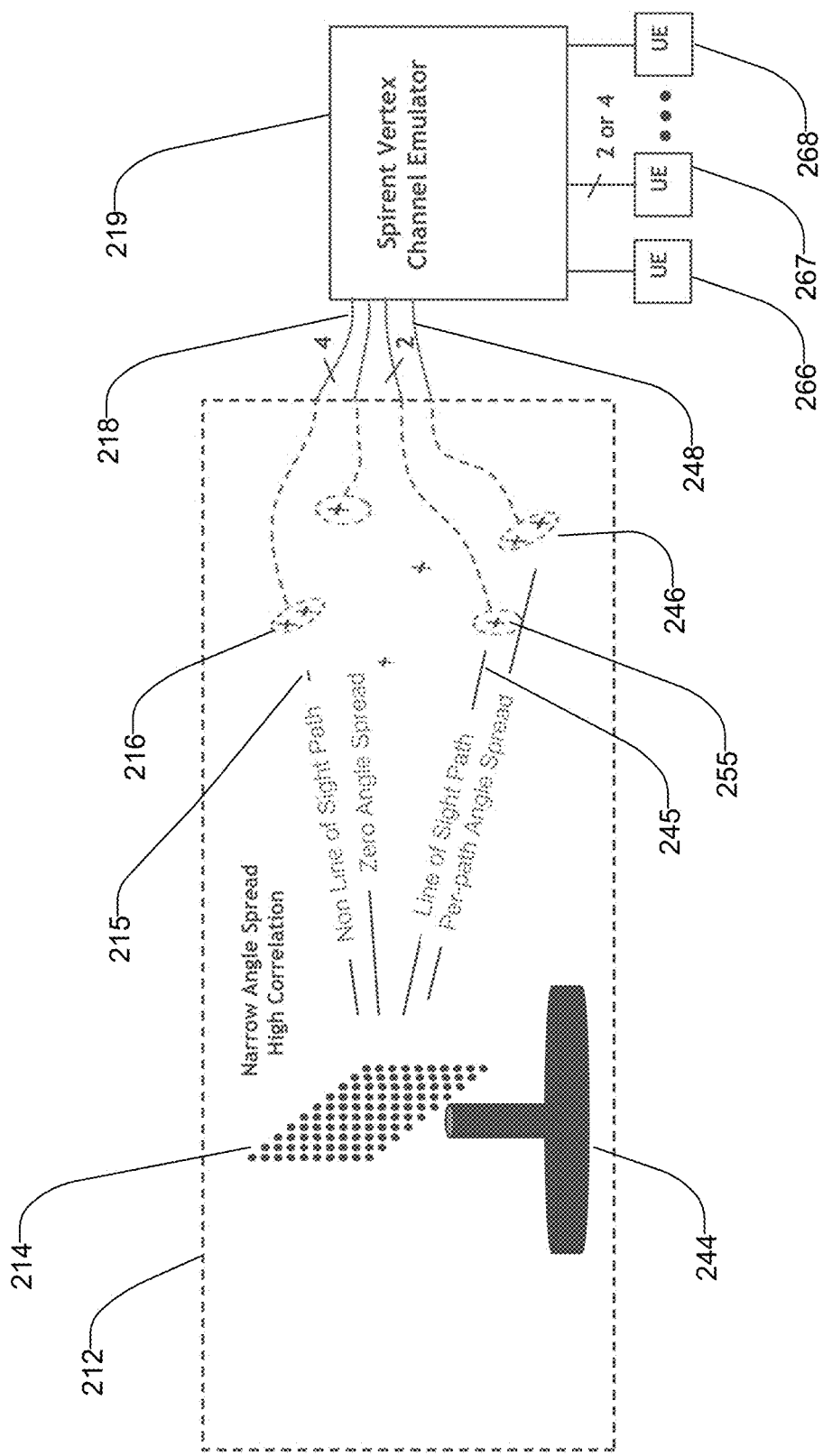
FIG. 2 shows a massive MIMO array antenna in an anechoic chamber.

FIG. 2 shows a massive MIMO array antenna 214 with narrow angle spread and high correlation, in an anechoic chamber 212 and connected to a mount 244 that can be controlled for tilting and rotating the array, which is needed when a test requires the array to be repositioned. In one implementation, mount 244 can be a two axis positioner stand. A rotation-only mount can be used in some cases, as it can be dramatically less expensive than a mount that includes tilt. In other test cases two degrees of freedom, including both rotation and tilt, or three degrees of freedom including rotation, tilt and roll are needed for testing of a MIMO array antenna positioned in the chamber. Several probe antenna elements 216, 246 are shown on the right side of the chamber, each having a vertical and a horizontal element configured as a "+" with each element being connected to an RF cable 218, 248 that leads outside the chamber to a Spirent Vertex Channel Emulator 219. The Spirent Vertex Channel Emulator platform supports scalable emulation to support a range of applications that require varying channel densities, from basic applications like two-channel SISO to complex, high channel density applications like MIMO OTA and carrier aggregation, and supports configurations to evaluate future technologies such as 5G.

In some cases amplifier stages may be utilized between one or more probe elements and the channel emulator to condition the signal level. A splitter may also be used to drive more than one input of the channel emulator from a single probe antenna element in order to emulate some of the channel conditions of interest, or to facilitate the case of using multiple carrier frequencies. The operation of the massive MIMO array antenna 214 is typically bi-directional, so both uplink and downlink signals are emulated. It is usually a time division duplex (TDD) system with the same carrier frequency used on the uplink and downlink, but it may also be a frequency division duplex (FDD) system, with different frequencies used on the uplink and downlink. UE 266, 267 and 268 can be phones or emulated phones. A BS or BS emulator controls the UE, setting up a test mode, creating or simulating data, measuring throughput (TP), and monitoring both the uplink and downlink.

The LOS path 245 is emulated by a single dual polarized probe 255, so that the MIMO array antenna 214 sees only a single angle in azimuth and elevation to this probe. Thus there is no AS observed at the MIMO array antenna 214 and a static channel is assumed for the emulated propagation path within the channel emulator. For the NLOS path 215, two dual polarized probe antennas 216 are utilized to facilitate a specific azimuth and elevation spread. Referenced to the downlink, this would be an azimuth spread of departure (ASD) and elevation spread of departure (ESD). Although two dual polarized probes 216 are shown, three or more may be needed in order to meet the target characteristics of the ASD and ESD across the MM array dimensions.

Figure 3:
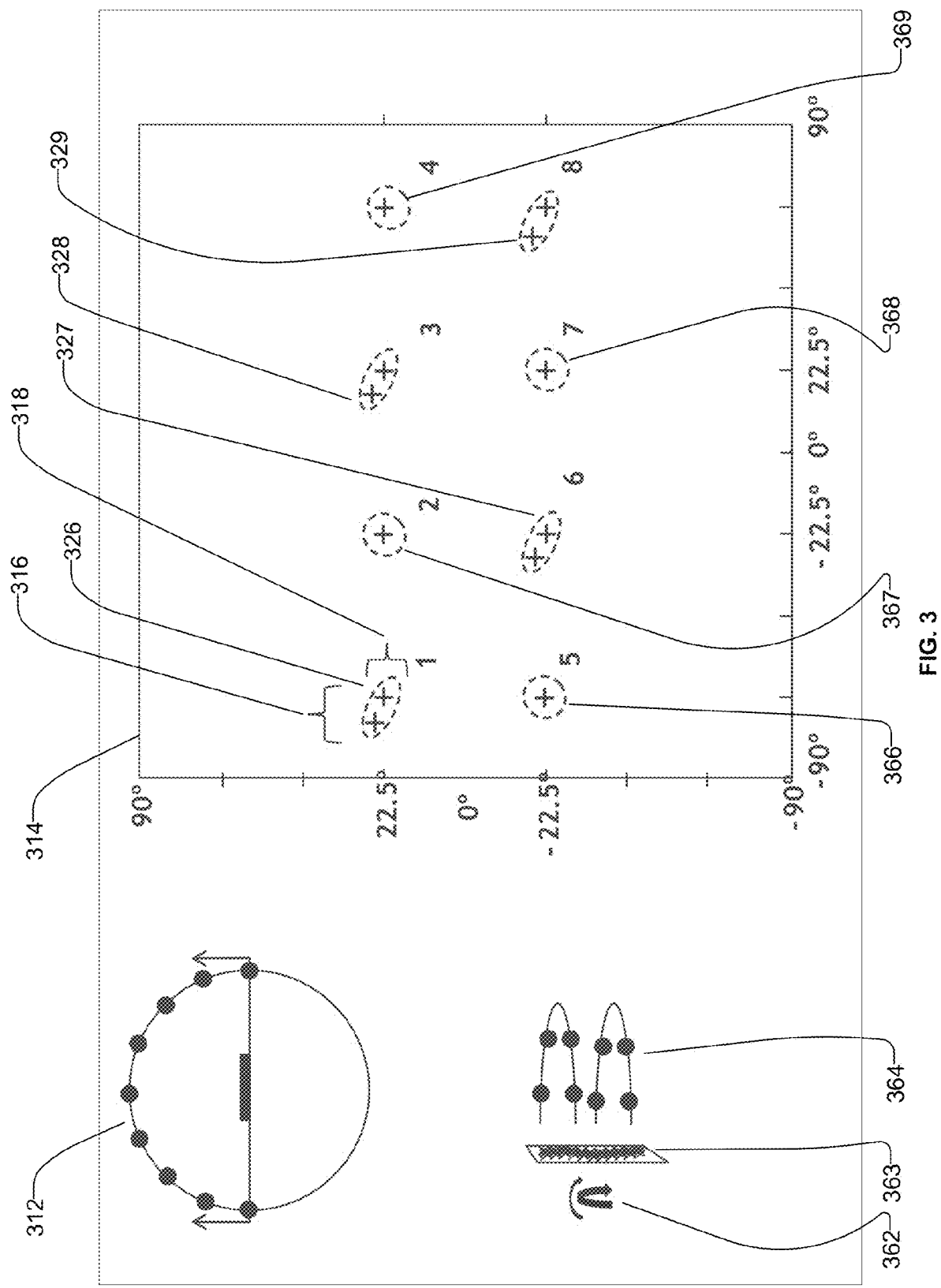
FIG. 3 illustrates, for a multi-user LOS and NLOS test, a top view, perspective view and an azimuth and elevation map that plots positions of UEs across the field of view.

FIG. 3 illustrates, for a multi-user LOS and NLOS test, a top view 312 of the possible probe placement in the anechoic chamber, and a perspective view of a MM array 363 relative to a mix of probes 364, with 3-axis positioner 362. Additionally an azimuth and elevation map 314 plots positions of probes across the field of view, with the X axis as azimuth and the Y axis as elevation. The map 314 identifies several probe locations as possible positions in the chamber relative to the test volume where the MM array 363 will be positioned. The map 314 includes a callout for the measurement for azimuth spread 316 and elevation spread 318 for one NLOS probe set 326. Each dual polarized "+" probe shown on the map 314 represents a LOS path departure 366, 367, 368, 369 for the downlink, and arrival for the uplink. Each dual polarized pair of "+" antennas 326, 327, 328 and 329 represents a NLOS path, which has a specific ASD and ESD for the downlink and a corresponding ASA and ESA for the uplink.

In terms of the downlink, the probe antennas illustrated in FIG. 3 represent path departure angles to a set of UEs, similar to those shown in FIG. 1, in which each UE observes only a single path. In the case in which a user experiences multi-path, more than one departure angle may arrive at the UE, and this would require an additional set of NLOS probes. A single departure angle can provide signals to two UEs, as is also illustrated in FIG. 1. In this case, the signals are split by an RF splitter and fed to different inputs or outputs of the channel emulator, or may be routed to multiple UEs from within the channel emulator.

The probe positions shown in FIG. 3 are primarily spread out in azimuth more than elevation, but the example MIMO array 363 has more elevation discrimination than azimuth because it has 16 dual polarized elements in the vertical dimension and only 8 dual polarized elements in the horizontal dimension. As one aspect of the test, the MIMO array 363 may be rolled by 90 degrees, so that the 16 elements may be used to view the azimuth. If the probe arrangements are not symmetric with respect to the array, it may also be useful to roll the array by 180 degrees so that different portions of the array can observer the chamber probes.

The position of the MIMO array 363 may also be tilted in elevation via the 3 axis positioner 362 so that the probes in the anechoic chamber are observed at a shifted elevation. Likewise, the MIMO array 363 may be tilted in azimuth so that the probes in the chamber are observed at a shifted azimuth—a feature usable to test the performance for angles near the edges of the array.

Figure 4:
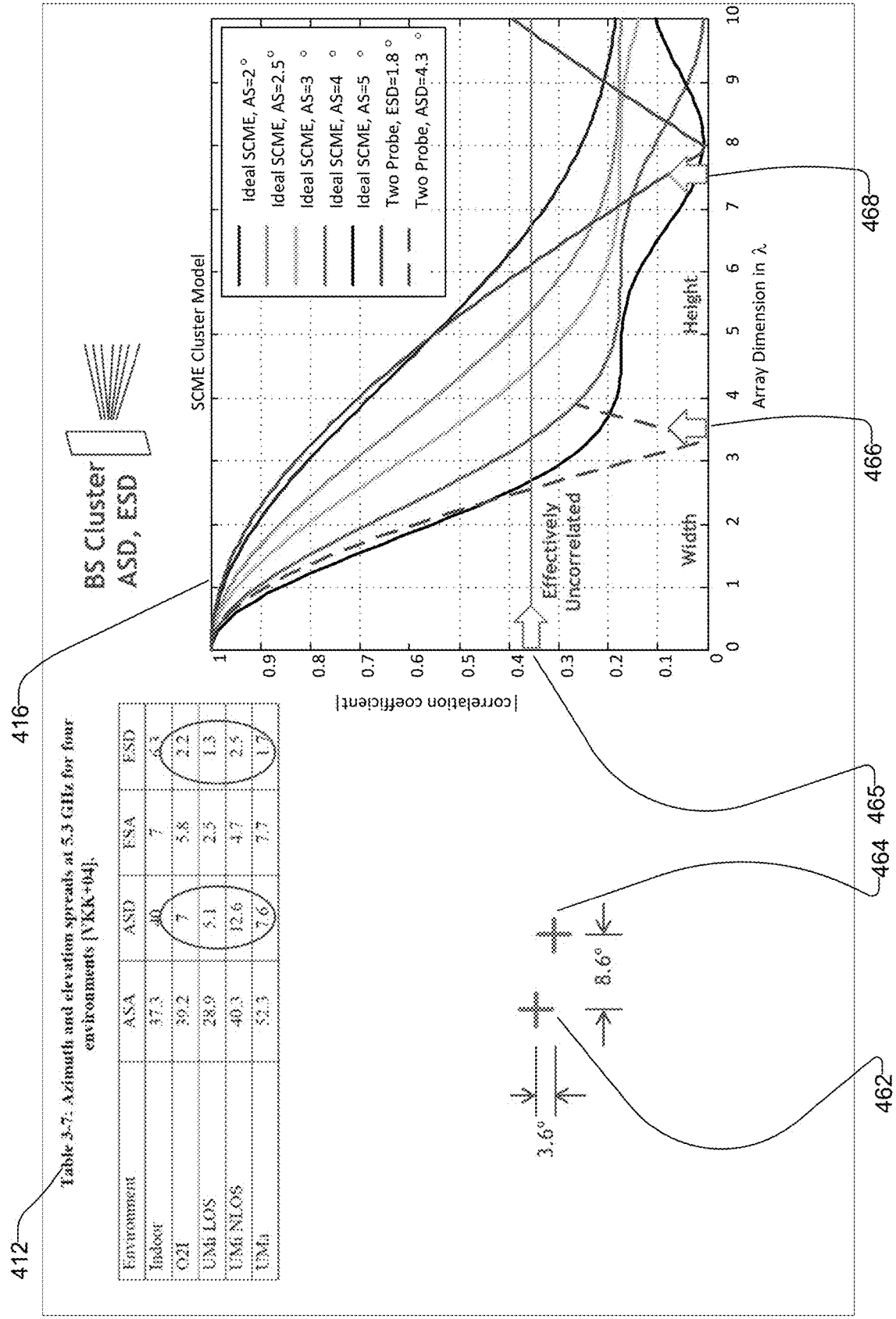
FIG. 4 illustrates spatial correlation results, for two probes, at an MM array.

FIG. 4 illustrates spatial correlation results at the MIMO array 363, showing the differences in elevation spread (ESD) and azimuth spread (ASD) 412 that may be observed as described by the "Winner+" model (reference: Winner+ D5.3_v1.0.pdf). Based on this reference among others, target values were chosen as ASD=5 degrees and ESD=2 degrees. With two probes having equal power and separated by an angle of N degrees, the RMS angle spread will be N/2 degrees.

Several models, including "SCME" and the "Winner" model utilize a predefined set of 20 sub-path components that are distributed to achieve the target AS. The SCME Cluster Model correlation plot 416 shows results for AS values of 2, 2.5, 3, 4, and 5 degrees. Since the target values chosen for this design are 2 degrees for ESD and 5 degrees for ASD, these two curves need to be observed across the horizontal and vertical array dimensions. The array dimension is given with respect to a first array element at zero; that is, with the first element at zero, and the elements spaced by 0.5 lambda, the 8th element will be seen at 3.5 lambda— where lambda is the wavelength of the carrier frequency. In this example, a 128 element array is considered, wherein the array has 16 dual polarized "X" antennas in the vertical dimension and 8 dual polarized "X" antennas in the horizontal. Thus we need to match the desired curves to the 3.5 lambda point for the ASD 466 and the 7.5 lambda point for the ESD 468. Two probes can align with the plotted spatial correlation curves for these parameters for the specified array dimensions, wherein the alignment is not critical below about 0.3-0.4 correlation 465, which is the point at which the channel looks like an uncorrelated receiver. For the two probe case, the AS isn't quite the same as the AS of the target curves when the best alignment is achieved. This is because the AS calculated with two components compared to 20 components is not quite a linear relationship. Thus the ESD (downlink) and ESA (uplink) values are a fraction of a degree less for the two probe design, which is expected. With two probes, the first "+" probe 462 is given a different azimuth and elevation to that of the second "+" probe 464. This achieves both an ASD and ESD when observed in the chamber.

Figure 11:
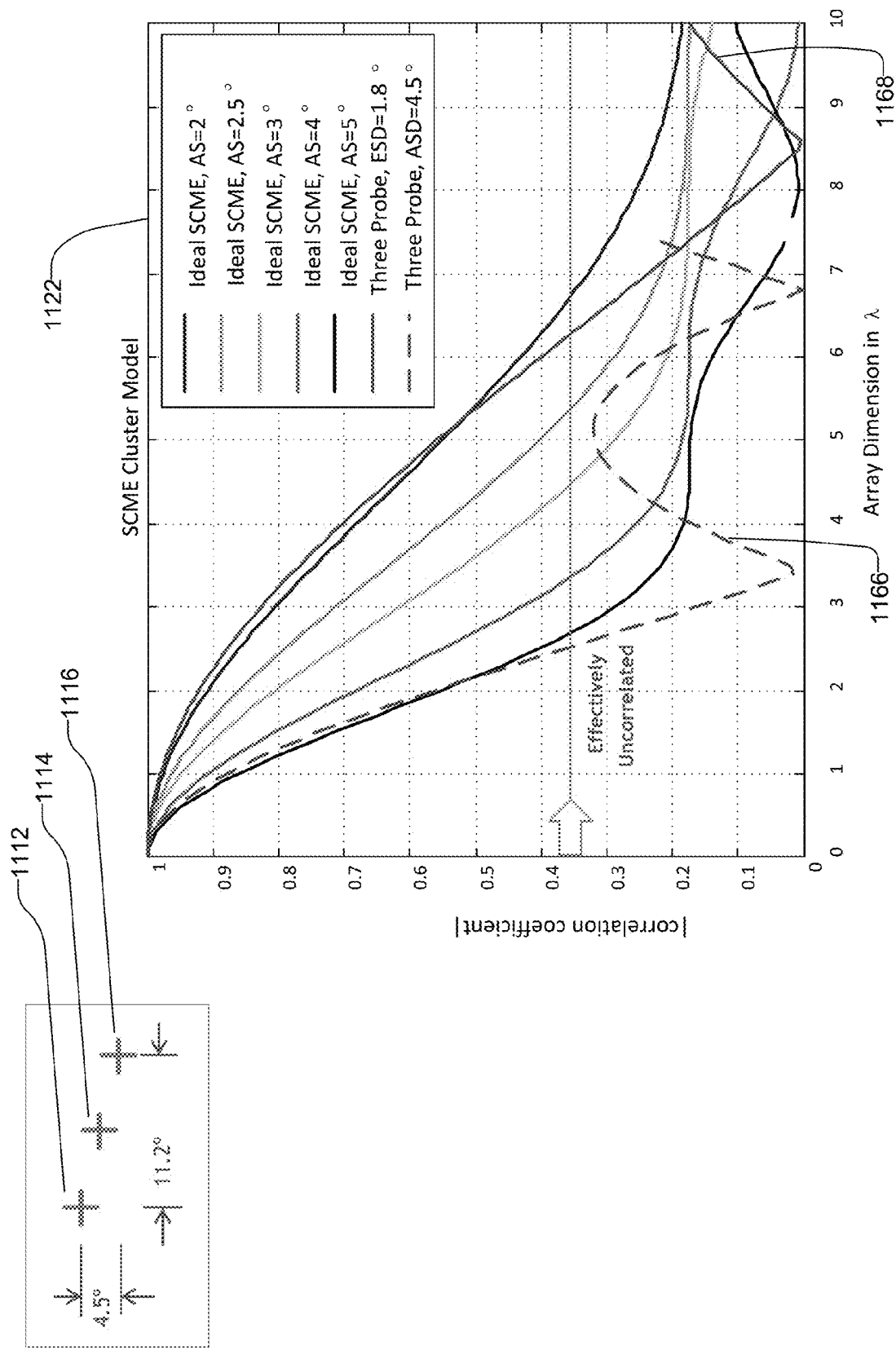
FIG. 11 illustrates spatial correlation results, for three probes, at an MM array.

In the test case in which a larger array was used, such as a 256 element array, in which the width is doubled, then the match to the ASD must be maintained out to 7.5 lambda and this is not possible with only two probes, because the correlation coefficient magnitude has a fly-back behavior. In this case, three or more probes would be necessary and the powers and angles of the probes would be optimized to achieve the ASD alignment over the full dimension of the array. It is possible to utilize two probes for ESD and three or more for ASD. However if the probes are available, then utilizing them will improve the performance of both ESD and ASD alignment. FIG. 11 shows a SCME Cluster Model correlation plot 1122 that includes three probes 1112, 1114, 1116 with probe power distribution of 0.33, 0.34 and 0.33, for ESD=1.8 1168 and for ASD=4.5 1166. The behavior of the 3 probe example is shown to match the target ESD of 2 degrees and ASD of 5 degrees of the standardized 20 sinusoid cluster channel model. The benefit of having 3 probes in this example is to maintain a match to the expected ASD characteristic further out in separation distance given by the Array Dimension in lambda. When the correlation is below a value of 0.3 to 0.4 the signals being compared are considered uncorrelated, and an exact match is no required as long as it stays below this level. As seen in the 3-probe curve 1166, the correlation matches well at the higher levels, i.e. above 0.4, and it maintains its low performance below 0.3-0.4 without the fly-back behavior that resulted from 2 probes shown by 466. Thus the 3 probe case can operate with a larger array size.

With the three probe case, the connection matrices shown in 812 and 912 would include additional probe connections at 813, 815, and 915, corresponding to the larger probe count.

Note that although examples of 2 and 3 probes are shown as an approach to minimize the number of probes, it is possible to use a larger number of probes, including a linear or two dimensional array of probes to represent each cluster in the chamber, e.g. 327, 328, 329.

Figure 5:
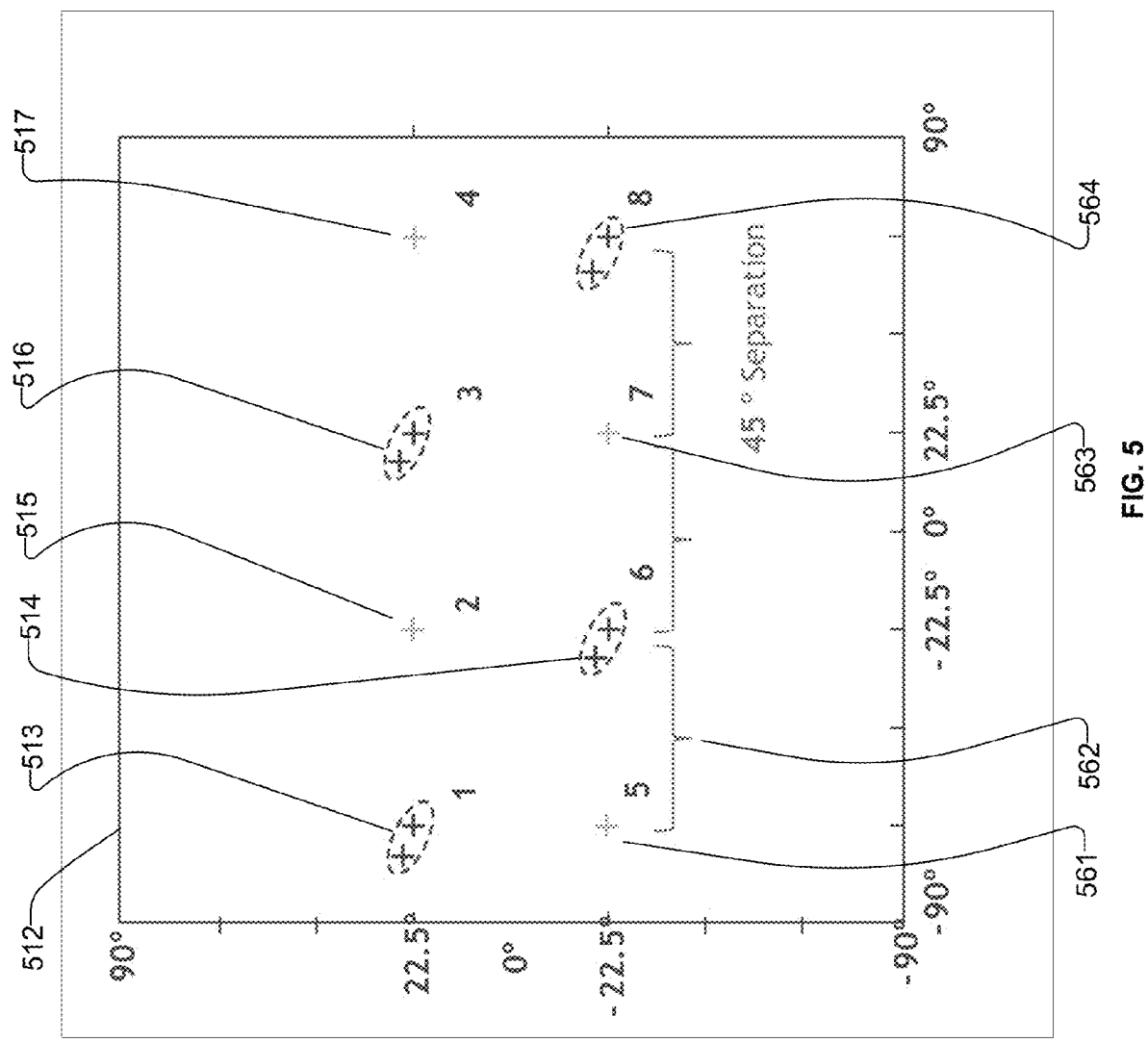
FIG. 5 shows a multi-user LOS and NLOS test map for comparing isolation between beams.

FIG. 5 shows a multi-user LOS and NLOS test map 512 for comparing isolation between beams. If users do not achieve maximum throughput, this test may indicate that beam overlap is degrading the signal to interference (SIR) per user. When the probes are spatially distributed by some amount, the MIMO array system is designed to be able to distinguish the different propagation paths, which are connected to different users. Depending on the MIMO array, there may be some degradation from incompletely isolating the users, and this would result in limited SIR, and lead to reduced throughput (TP) to a user. This can be tested by as shown in FIG. 5, by increasing the spacing between probe one 513 and probe six 514, between probe six 514 and probe three 516, and between probe three 516 and probe eight 564 to 45 degrees. In this case this effect is achieved by turning off some users, represented with dimmed "+" 515, 517, 561 and 563. The test compares TP per user with a fully populated environment and TP per user with a sparsely populated environment.

Figure 6:
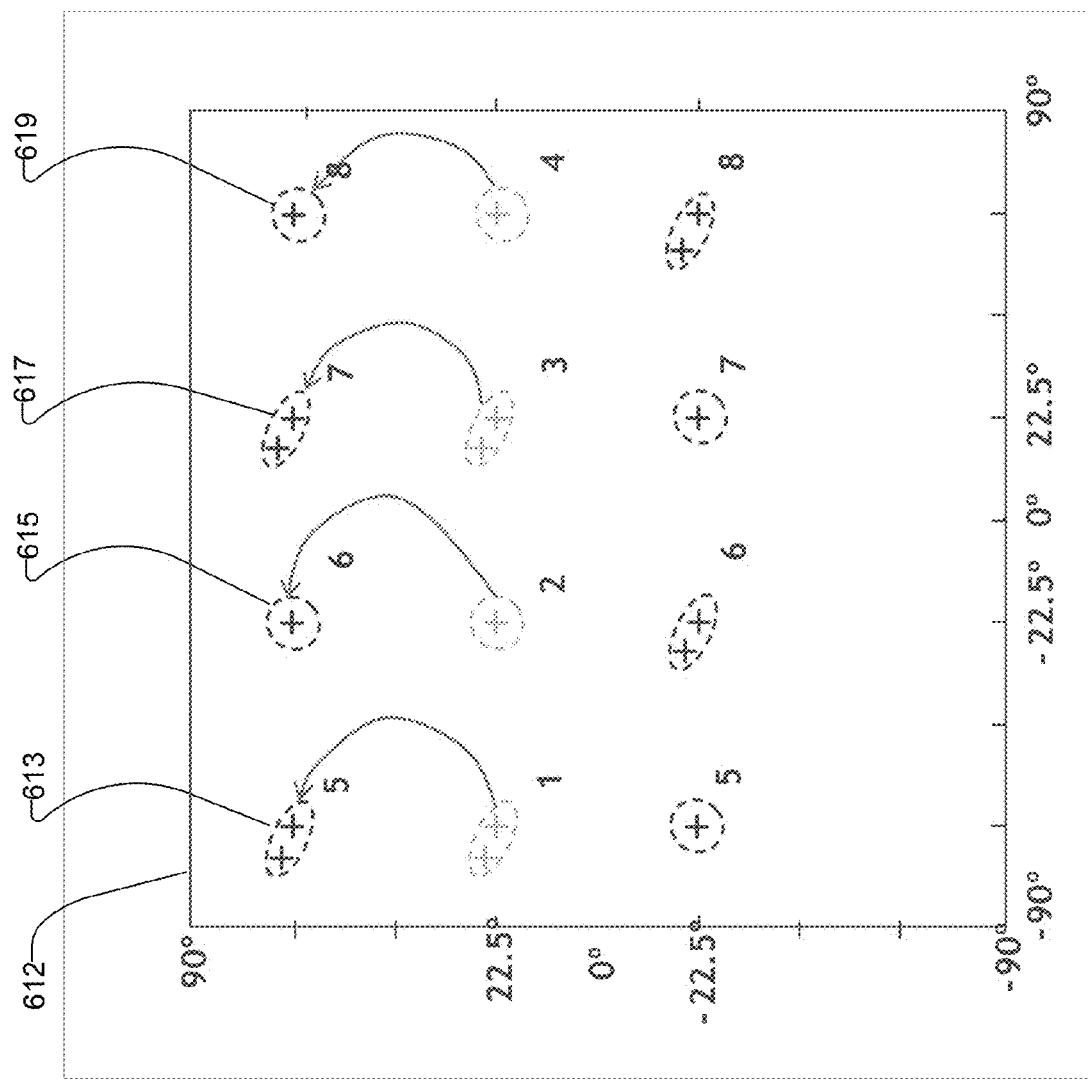
FIG. 6 illustrates an adaptive probe layout map for multi-user LOS and NLOS tests.

FIG. 6 illustrates an adaptive probe layout map 612 for multi-user LOS and NLOS tests, to show the concept of switching probe positions by either physically moving the cable from one probe to another, or by utilizing an RF switch. In one example implementation, disconnecting or switching off an antenna may include connecting a fifty ohm terminator to reduce reflections from the unused probed. This provides a way to effectively change the probe location in the chamber to modify the test. For one example test, the top row of probes is electrically switched to a higher row of probes 613, 615, 617 and 619 at +67.5 degrees. In some test cases, the array can be tilted up, so that the simultaneous probes will be positioned at +/−45 degrees.

Figure 7:
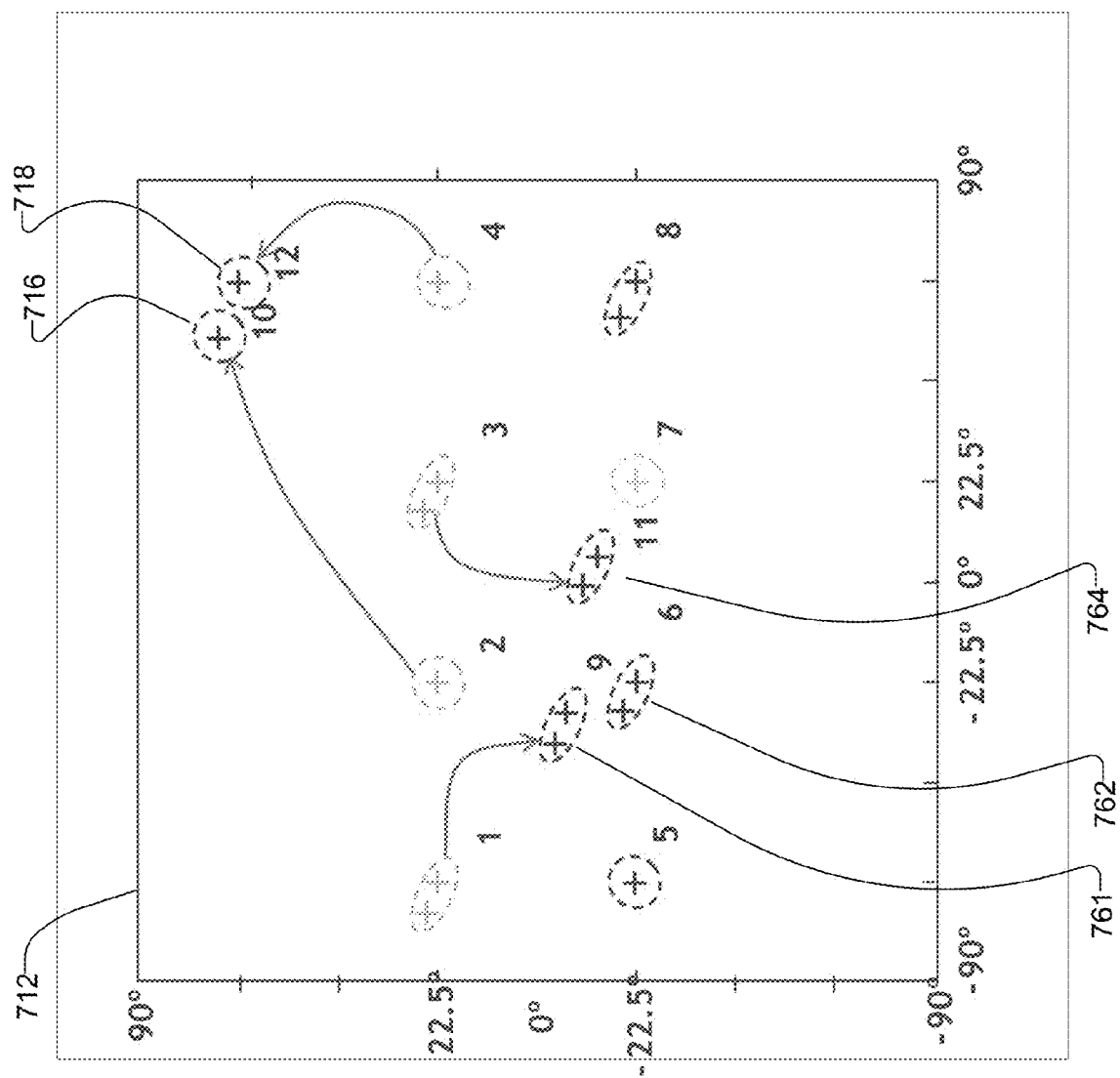
FIG. 7 illustrates another adaptive probe layout map for multi-user LOS and NLOS tests, in which the probe locations are chosen to create a set of similar path directions.

FIG. 7 illustrates another adaptive probe layout map 712 for multi-user LOS and NLOS tests. In this example, the probe locations are chosen to create a set of similar path directions. This represents the case in which multiple users may be close together, and experience similar propagation paths. For example, probe six 762, probe nine 761, and probe eleven 764 for NLOS users, and probe ten 716 and probe twelve 718 for LOS users. This is a difficult case for the MIMO array to resolve since these angles are close together and the array may not be able to do so, leading to reduction in TP to these users. This is an important test case in which there is spatial coherence between users.

Figure 8:
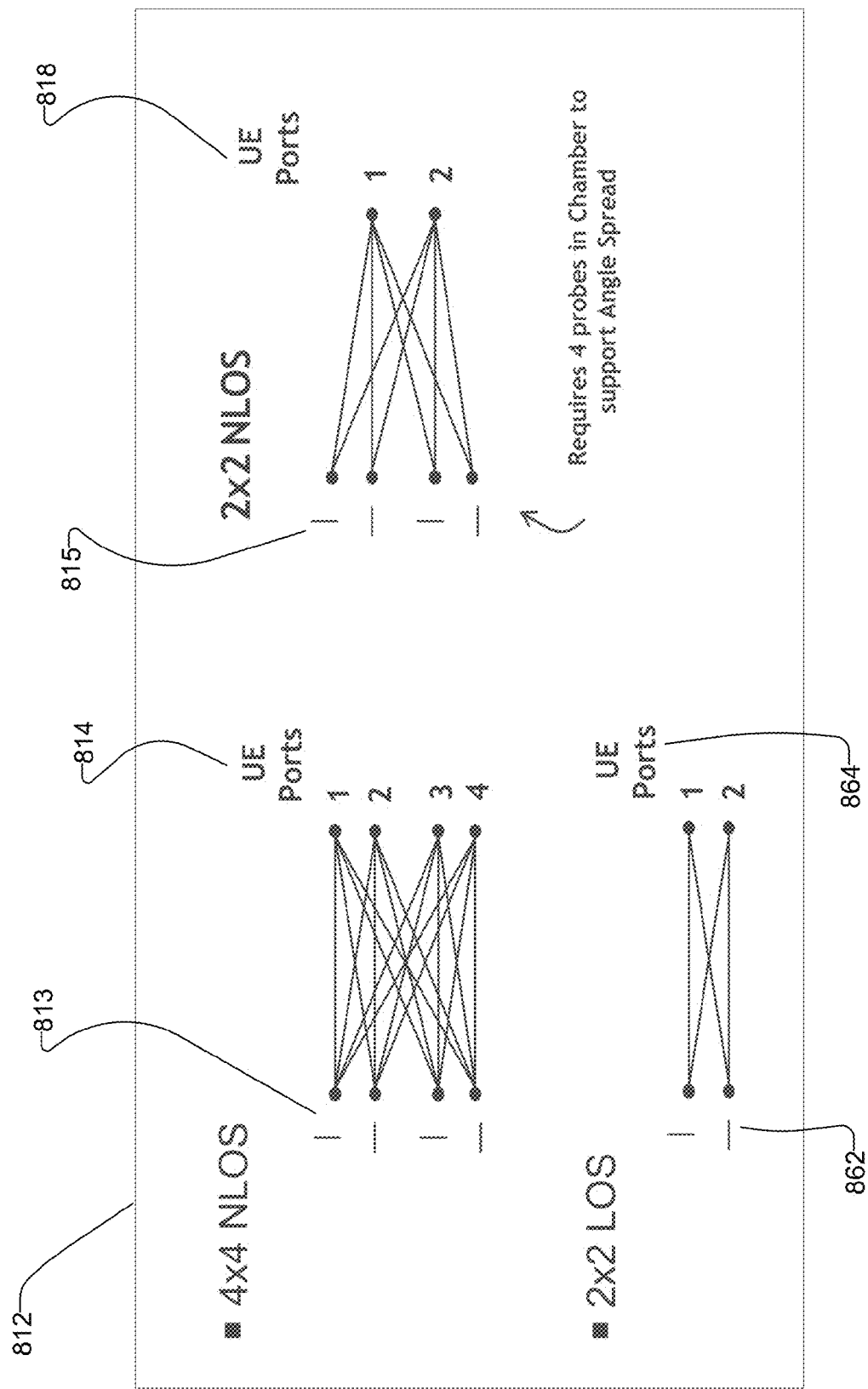
FIG. 8 illustrates the channel matrix inside the channel emulator referenced to the downlink.

FIG. 8 illustrates the channel matrix 812 inside the channel emulator, referenced to the downlink. The chamber probes 813, 815 and 862 are shown on the left, and are connected to the inputs of the channel emulator. The UE ports 814, 864 and 818 are shown on the right. Each link between the input and output represents a fading connection between the base station (BS) and UE. For the NLOS case, the vertical and horizontal probe elements that make up each path are uncorrelated such that the correlation between BS elements is set by the angle differences between the probes, as described relative to FIG. 4. Correlations at the UE antenna elements are determined by the channel model and UE antenna assumptions. For the three probe case that supports wider arrays, a larger H matrix would be implemented.

Figure 9:
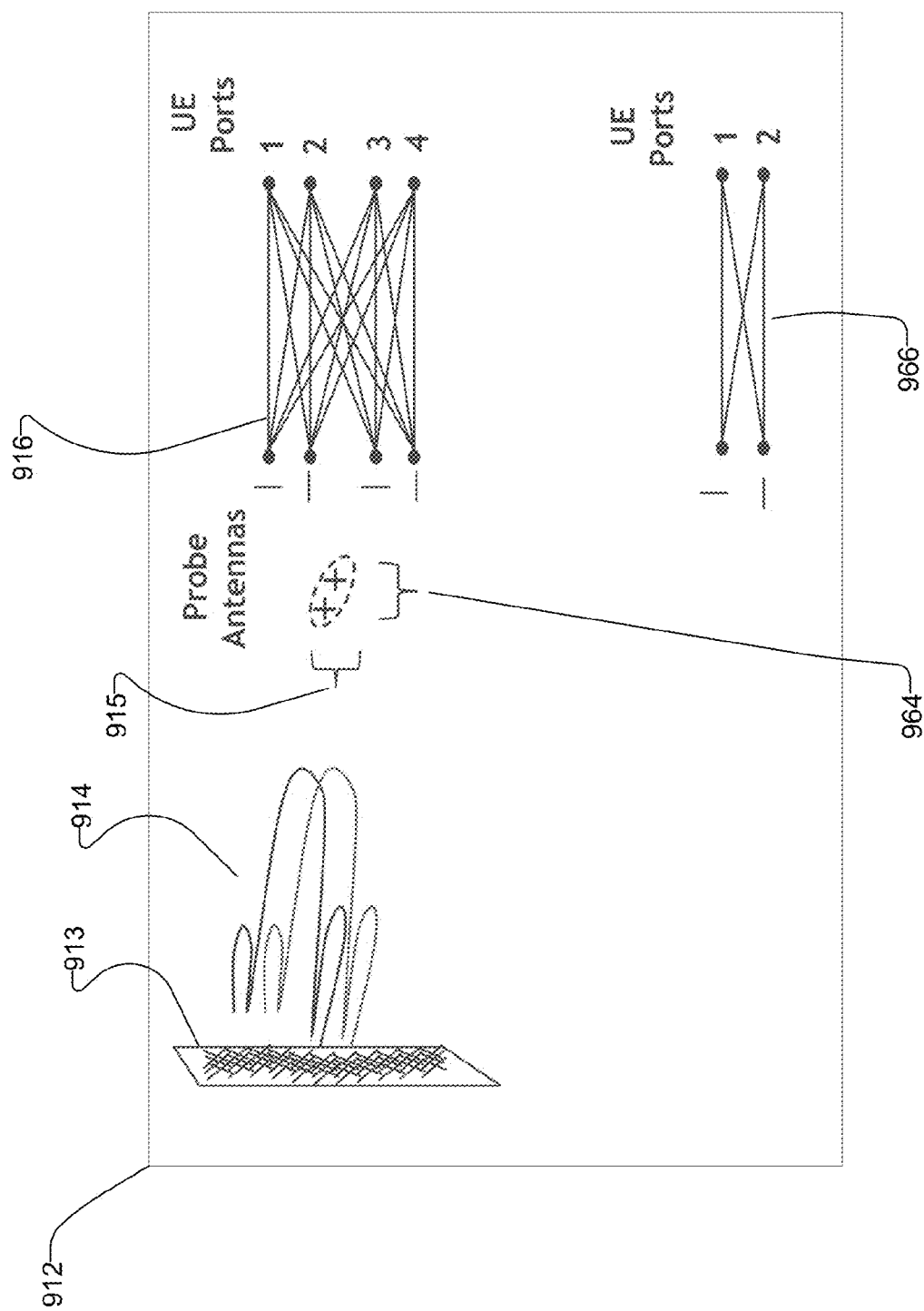
FIG. 9 displays probes observed from the center of test volume, with unrelated streams from different parts of the array.

FIG. 9 displays probes observed from the center of test volume 912—showing unrelated streams 914 from different parts of MIMO array 913. FIG. 9 further illustrates the 4×4 MIMO channel emulation 916, in which the elevation spread for NLOS 915 and the azimuth spread for NLOS 964 create the potential for decorrelation across the array, leading to four separate streams being possible. FIG. 9 also includes 2×2 LOS MIMO channel emulation 966.

Computer System

Figure 10:
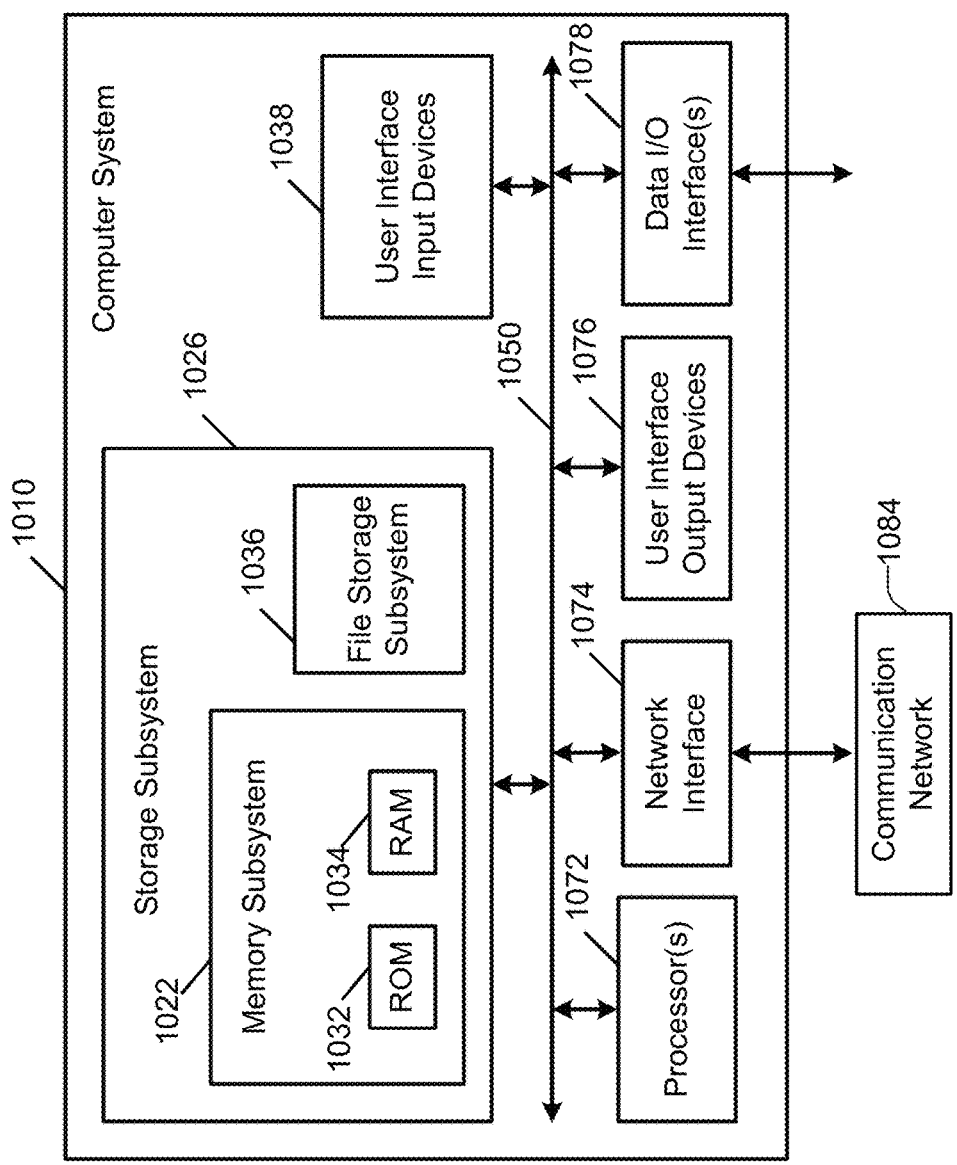
FIG. 10 is a simplified block diagram of a system for emulating a massive MIMO array.

FIG. 10 is a simplified block diagram of an embodiment of a system 1000 that can be used for testing a beamforming antenna array. MIMO array testing can be implemented using a computer program stored in system memory, or stored on other memory and distributed as an article of manufacture, separately from the computer system.

Computer system 1010 typically includes a processor subsystem 1072 which communicates with a number of peripheral devices via bus subsystem 1050. These peripheral devices may include a storage subsystem 1026, comprising a memory subsystem 1022 and a file storage subsystem 1036, user interface input devices 1038, user interface output devices 1078, and a network interface subsystem 1076. The input and output devices allow user interaction with computer system 1010 and network and channel emulators. Network interface subsystem 1074 provides an interface to outside networks and devices of the system 1000. The computer system further includes communication network 1084 that can be used to communicate with user equipment (UE) units; for example, as a device under test.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

User interface input devices 1038 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1010.

User interface output devices 1078 may include a display subsystem, a printer, a fax machine, or non-visual displays such as audio output devices. The display subsystem may include a cathode ray tube (CRT), a flat panel device such as a liquid crystal display (LCD) or LED device, a projection device, or some other mechanism for creating a visible image. The display subsystem may also provide non visual display such as via audio output devices. In general, use of the term "output device" is intended to include all possible types of devices and ways to output information from computer system 1010 to the user or to another machine or computer system. The computer system further can include user interface output devices 1078 for communication with user equipment.

Storage subsystem 1026 stores the basic programming and data constructs that provide the functionality of certain embodiments of the present invention. For example, the various modules implementing the functionality of certain embodiments of the invention may be stored in a storage subsystem 1026. These software modules are generally executed by processor subsystem 1072.

Storage subsystem 1026 typically includes a number of memories including a main random access memory (RAM) 1034 for storage of instructions and data during program execution and a read only memory (ROM) 1032 in which fixed instructions are stored. File storage subsystem 1036 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1036. The host memory storage subsystem 1026 contains, among other things, computer instructions which, when executed by the processor subsystem 1072, cause the computer system to operate or perform functions as described herein. As used herein, processes and software that are said to run in or on "the host" or "the computer", execute on the processor subsystem 1072 in response to computer instructions and data in the host memory storage subsystem 1026 including any other local or remote storage for such instructions and data.

Bus subsystem 1050 provides a mechanism for letting the various components and subsystems of computer system 1010 communicate with each other as intended. Although bus subsystem 1050 is shown schematically as a single bus, alternative embodiments of the bus subsystem may use multiple busses.

Computer system 1010 itself can be of varying types including a personal computer, a portable computer, a workstation, a computer terminal, a network computer, a television, a mainframe, or any other data processing system or user device. Due to the ever changing nature of computers and networks, the description of computer system 1010 depicted in FIG. 10 is intended only as a specific example for purposes of illustrating embodiments of the present invention. Many other configurations of computer system 1010 are possible having more or less components than the computer system depicted in FIG. 10.

Some Particular Implementations

In one implementation, the disclosed technology includes a system that tests a massive MIMO array antenna, the system including an anechoic chamber; a mount for a MIMO array antenna positioned in the chamber, wherein the array has at least 8×4 antenna elements that are individually activated to steer transmissions from the array; at least 3 dual element antenna probes positionable in the anechoic chamber; feeds coupling one or more UE sources to the antenna probes, the UE sources generating RF in over-the-air communication with the array, the UE sources emulating multiple UE devices; base station electronics coupled to the array; and a test controller coupled to the base station electronics; wherein the test controller signals the UE sources over-the-air via the array to invoke a connection to the UE sources and measure over-the-air channel performance between the array and each of the multiple UE devices emulated, the performance including at least throughput. The UE sources are usable in both uplink and downlink tests. In some implementations, one probe can be associated with one UE and in that case three UEs would be needed for the three probe system. In other implementations one UE is needed for the two probe NLOS case, and when the beam is spread, so that two probes emulate the angular spread, and one UE is needed for the one probe LOS case.

This system and other implementations of the technology disclosed can include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations.

In one implementation the disclosed system includes a mount controllable to rotate relative to a horizontal base of the anechoic chamber. In other implementations, the mount is further controllable to tilt the array relative to a point of attachment of the array to the mount. In yet other implementations, the mount is further controllable to roll relative to the point of attachment of the array to the mount.

In some implementations, the system further includes at least one pair of dual element antenna probes coupled to a single source, thereby emulating an angular spread in arrival direction among signal components of a signal originating at UE. The system can also include the feeds coupling one or more UE sources through a channel emulator that varies the over-the-air channel conditions between the antenna probes and the array.

One implementation of the disclosed system further includes the base station electronics configured to send the UE sources commands over RF signals to adjust UE power level, data connection and data rate. In some implementations the system can further include a network emulator coupled between the test controller and the base station electronics, wherein the network emulator causes the base station electronics to send signals to the UE that control UE power level, data connection and data rate. Data connection can include the configuration details of the data transmission, including details on the selection in LTE of the duplex mode, transmission mode, bandwidth, fixed reference channel, modulation, transmission block size, MIMO order, number of resource blocks or other details about the data connection.

In some implementations, the UE sources include individual UE devices in individual RF isolation boxes. In other implementations, the UE sources include a UE source device simulator that emulates the multiple UE devices.

One implementation of the disclosed system includes a radio distribution unit, connected between the array and the base station electronics, wherein the radio distribution unit distributes signals to each array element and controls one or more beam patterns by selectively weighting signals distributed to the antenna elements by complex gain and delay values. The delay values can have a value of zero; with wider bandwidths, the delays may need to be compensated so that the phase remains accurate across frequency. The disclosed system can further include a channel from the test controller to the channel emulator used by the test controller to vary the over-the-air channel conditions. In other implementations of the disclosed system, the channel from the test controller to the channel emulator is wired.

In some implementations of the disclosed system, the measured over-the-air channel observed by the massive MIMO array is an emulation of a downlink channel. In other implementations, the measured over-the-air channel observed by the massive MIMO array is an emulation of an uplink channel. In yet other implementations, the measured over-the-air channel observed by the massive MIMO array is an emulation of a bi-directional channel, including downlink and uplink.

One implementation of the disclosed technology further includes a first distribution of test probes in the chamber that are substantially separated to allow the massive MIMO to observe isolation between directions to multiple users, then evaluating the performance for this set of probes according to a reference direction of the massive MIMO array, wherein the massive MIMO array can be rotated or tilted or rolled to observe the performance when probes fall at the center versus at an edge of array coverage.

Another implementation of the disclosed technology further includes a second distribution of test probes in the chamber that are substantially clumped in a similar area to allow the massive MIMO to observe lower isolation between directions to multiple users, then evaluating the performance for this set of probes according to a reference direction of the massive MIMO array, wherein the massive MIMO array can be rotated or tilted or rolled to observe the performance when probes fall at the center versus at an edge of array coverage.

Other implementations may include a method according to any of the preceding systems, described above, including methods for testing a massive MIMO array antenna.

Yet other implementations include tangible non-transitory computer readable storage media storing instructions executable by a processor to control a system as described above. A tangible non-transitory computer readable media does not include a transitory wave form.

I claim:

1. A system that tests a massive MIMO array antenna, the system including:
   an anechoic chamber;
   a mount for a MIMO array antenna positioned in the anechoic chamber, wherein the MIMO array antenna has at least 8×4 antenna elements that are individually activated to steer transmissions from the MIMO array antenna;
   at least one pair of dual element antenna probes positionable in the anechoic chamber;
   feeds coupling one or more UE sources to the dual element antenna probes, the UE sources generating RF in over-the-air communication with the MIMO array antenna, the UE sources emulating multiple UE devices;
   base station electronics coupled to the MIMO array antenna;
   a test controller coupled to the base station electronics;
   wherein the test controller signals the UE sources over-the-air via the MIMO array antenna to invoke a connection to the UE sources and measure over-the-air channel performance between the MIMO array antenna and each of the multiple UE devices emulated, the performance including at least throughput; and
   a first distribution of test probes in the anechoic chamber, wherein dual element antenna probes in the first distribution of test probes are substantially clumped in an area to allow the MIMO array antenna to observe isolation between directions to multiple users, then evaluating performance for the first distribution of test probes according to a reference direction of the MIMO array antenna, wherein the MIMO array antenna can be rotated or tilted or rolled to observe the performance when test probes fall at the center versus at an edge of array coverage.

2. The system of claim 1, further including a single one of the at least a plurality of dual element antenna probes coupled to a single UE source.

3. The system of claim 1, further including at least a first UE source and a second UE source, a first set of 2 or more probes coupled to the first UE source and a second set of 2 or more probes coupled to the second UE source and wherein the first set of 2 or more probes and the second set of 2 or more probes share at least one probe.

4. The system of claim 1, wherein elements of at least one dual element antenna probe are substantially orthogonal, and further including applying a first signal from a first UE to a first element of the at least one dual element antenna probe and a second signal from a second UE to a second element of the at least one dual element antenna probe.

5. The system of claim 1, further including increasing spacing between selected test probes in the anechoic chamber wherein dual element antenna probes of selected test probes are spatially distributed to allow the MIMO array antenna to observe a change in isolation between directions to multiple users, then evaluating performance for this set of test probes according to a reference direction of the MIMO array antenna, wherein the MIMO array antenna can be rotated or tilted or rolled to observe performance when test probes fall at the center versus at an edge of array coverage.

6. The system of claim 1, further including a second distribution of a set of test probes in the anechoic chamber wherein dual element antenna probes in the set of test probes are substantially separated to allow the MIMO array antenna to observe a change in isolation between directions to multiple users, then evaluating performance for this set of test probes according to a reference direction of the MIMO array antenna, wherein the MIMO array antenna can be rotated or tilted or rolled to observe performance when test probes fall at the center versus at an edge of array coverage.

7. A method for testing a MIMO array antenna, the method including:
positioning a MIMO array antenna on a mount in an anechoic chamber, wherein the MIMO array antenna has at least 8×4 antenna elements that are individually activated to steer transmissions from the MIMO array antenna;
using at least one pair of dual element antenna probes positioned in the anechoic chamber, generating RF in over-the-air communication with the MIMO array antenna, with feeds coupling one or more UE sources to the dual element antenna probes, wherein the UE sources emulate multiple UE devices;
signaling the UE sources over-the-air via the MIMO array antenna, using base station electronics coupled to a test controller, connecting with the UE sources;
evaluating performance according to a reference direction of the MIMO array antenna for a first distribution of test probes in the anechoic chamber wherein dual element antenna probes in the first distribution of test probes are substantially clumped in an area to allow the MIMO array antenna to observe isolation between directions to multiple users, wherein the MIMO array antenna can be rotated or tilted or rolled to observe the performance when probes fall at the center versus at an edge of array coverage; and
measuring over-the-air channel performance between the MIMO array antenna and each of the multiple UE devices emulated, the performance including at least throughput.

8. The method of claim 7, wherein a single one of the at least a plurality of dual element antenna probes coupled to a single UE source.

9. The method of claim 7, further including at least a first UE source and a second UE source, a first set of 2 or more probes coupled to the first UE source and a second set of 2 or more probes coupled to the second UE source, and wherein the first set of 2 or more probes and the second set of 2 or more probes share at least one probe.

10. The method of claim 7, wherein elements of at least one dual element antenna probe are substantially orthogonal, and further including applying a first signal from a first UE to a first element of the at least one dual element antenna probe and a second signal from a second UE to a second element of the at least one dual element antenna probe.

11. The method of claim 7, further including:
increasing spacing between selected test probes within the anechoic chamber, wherein dual element antenna probes of selected test probes are spatially distributed to allow the MIMO array antenna to observe a change in isolation between directions to multiple users;
evaluating performance according to the reference direction of the MIMO array antenna for the test probes, wherein the MIMO array antenna can be rotated or tilted or rolled to observe performance when test probes fall at the center versus at an edge of array coverage.

12. The method of claim 7, further including:
evaluating performance according to the reference direction of the MIMO array antenna for a second distribution of test probes in the anechoic chamber wherein dual element antenna probes in the second distribution of test probes are substantially separated to allow the MIMO array antenna to observe a change in isolation between directions to multiple users, wherein the MIMO array antenna can be rotated or tilted or rolled to observe performance when test probes fall at the center versus at an edge of array coverage.

13. A tangible non-transitory computer readable media with instructions that are combinable with a processor and memory coupled to the processor to carry out a method for testing a massive MIMO array antenna positioned within an anechoic chamber and having individually activated antenna elements to steer transmissions from the array, the method including:
using at least one pair of dual element antenna probes positioned in the anechoic chamber, generating RF in over-the-air communication with the MIMO array antenna, with feeds coupling one or more UE sources to the dual element antenna probes, wherein the UE sources emulate multiple UE devices;
signaling over-the-air via the MIMO array antenna, the UE sources using base station electronics coupled to a test controller, connecting with the UE sources;
evaluating performance according to a reference direction of the MIMO array antenna for a first distribution of test probes in the anechoic chamber wherein dual element antenna probes in the first distribution of test probes are substantially clumped in an area to allow the MIMO array antenna to observe isolation between directions to multiple users, wherein the MIMO array antenna can be rotated or tilted or rolled to observe the performance when probes fall at the center versus at an edge of array coverage; and
measuring over-the-air channel performance between the MIMO array antenna and each of the multiple UE devices emulated, the performance including at least throughput.

14. The tangible non-transitory computer readable media of claim 13, wherein a single one of the at least a plurality of dual element antenna probes coupled to a single UE source.

15. The tangible non-transitory computer readable media of claim 13, further including at least a first UE source and a second UE source, a first set of 2 or more probes coupled to the first UE source and a second set of 2 or more probes coupled to the second UE source, and wherein the first set of 2 or more probes and the second set of 2 or more probes share at least one probe.

16. The tangible non-transitory computer readable media of claim 13, wherein elements of at least one dual element antenna probe are substantially orthogonal, and further including applying a first signal from a first UE to a first element of the at least one dual element antenna probe and a second signal from a second UE to a second element of the at least one dual element antenna probe.

17. The tangible non-transitory computer readable media of claim 13, further including:
  increasing spacing between selected test probes within the anechoic chamber, wherein dual element antenna probes of selected test probes are spatially distributed to allow the MIMO array antenna to observe a change in isolation between directions to multiple users; and
  evaluating performance according to the reference direction of the MIMO array antenna for the test probes, wherein the MIMO array antenna can be rotated or tilted or rolled to observe performance when test probes fall at the center versus at an edge of array coverage.

18. The tangible non-transitory computer readable media of claim 13, further including:
  evaluating performance according to the reference direction of the MIMO array antenna for a second distribution of test probes in the anechoic chamber wherein dual element antenna probes in the second distribution of test probes are substantially separated to allow the MIMO array antenna to observe a change in isolation between directions to multiple users, wherein the MIMO array antenna can be rotated or tilted or rolled to observe performance when test probes fall at the center versus at an edge of array coverage.

* * * * *